(12) United States Patent
Bao et al.

(10) Patent No.: US 9,738,563 B1
(45) Date of Patent: Aug. 22, 2017

(54) ULTRA-FLEXIBLE NANO-MODIFIED CEMENTITIOUS WATERPROOFING COATING AND METHOD OF MANUFACTURING

(71) Applicant: Nano and Advanced Materials Institute Limited, Hong Kong (HK)

(72) Inventors: Su Ping Bao, Hong Kong (HK); Xin Kun Lu, Hong Kong (HK); Wen Jun Luo, Hong Kong (HK); Man Lung Sham, Hong Kong (HK)

(73) Assignee: Nona And Advanced Materials Institute Limited, Hong Kong (CN)

( * ) Notice: Subject to any disclaimer, the term of this patent is extended or adjusted under 35 U.S.C. 154(b) by 0 days.

(21) Appl. No.: 15/172,143

(22) Filed: Jun. 2, 2016

(51) Int. Cl.
| | |
|---|---|
| *C04B 24/26* | (2006.01) |
| *C04B 14/30* | (2006.01) |
| *C04B 14/28* | (2006.01) |
| *C04B 16/06* | (2006.01) |
| *C04B 28/04* | (2006.01) |
| *C04B 24/16* | (2006.01) |
| *C04B 24/42* | (2006.01) |
| *C04B 41/00* | (2006.01) |
| *C04B 41/50* | (2006.01) |
| *C04B 41/48* | (2006.01) |
| *C04B 103/32* | (2006.01) |
| *C04B 103/50* | (2006.01) |
| *C04B 103/65* | (2006.01) |

(52) U.S. Cl.
CPC .......... *C04B 24/2641* (2013.01); *C04B 14/28* (2013.01); *C04B 14/303* (2013.01); *C04B 16/0641* (2013.01); *C04B 16/0683* (2013.01); *C04B 24/166* (2013.01); *C04B 24/42* (2013.01); *C04B 28/04* (2013.01); *C04B 41/009* (2013.01); *C04B 41/483* (2013.01); *C04B 41/5079* (2013.01); *C04B 2103/32* (2013.01); *C04B 2103/50* (2013.01); *C04B 2103/65* (2013.01)

(58) Field of Classification Search
CPC ... C04B 24/2641; C04B 24/166; C04B 24/42; C04B 14/28; C04B 14/303; C04B 16/0683; C04B 16/0641; C04B 28/04; C04B 41/009; C04B 41/483; C04B 41/5079; C04B 2103/32; C04B 2103/50; C04B 2103/65
See application file for complete search history.

(56) References Cited

U.S. PATENT DOCUMENTS

| | | |
|---|---|---|
| 4,249,950 A | 2/1981 | Hurst |
| 4,392,335 A | 7/1983 | Heiman |
| 4,842,650 A | 6/1989 | Blounts |
| 5,162,060 A | 11/1992 | Bredow et al. |
| 5,543,188 A | 8/1996 | Te'eni |
| 6,419,737 B1 | 7/2002 | Haji |
| 6,455,615 B2 | 9/2002 | Yu et al. |
| 7,148,270 B2 | 12/2006 | Bowe |
| 7,347,895 B2 | 3/2008 | Dubey |
| 7,468,154 B2 | 12/2008 | Dubey |
| 7,784,542 B2 | 8/2010 | Roddy et al. |
| 8,598,093 B2 | 12/2013 | Roddy et al. |
| 8,931,228 B2 | 1/2015 | Wiercinski et al. |
| 9,067,383 B2 | 6/2015 | Dubey et al. |
| 9,133,612 B2 | 9/2015 | Wiercinski et al. |
| 9,302,448 B2 | 4/2016 | Dubey et al. |
| 2004/0229978 A1 | 11/2004 | Bowe |
| 2006/0054059 A1 | 3/2006 | Dubey et al. |
| 2008/0060299 A1 | 3/2008 | Dubey et al. |
| 2014/0121302 A1 | 5/2014 | Brien |
| 2015/0353797 A1 | 12/2015 | Kislig et al. |

OTHER PUBLICATIONS

Boberski et al., "Reducing the Viscosity of Magnesia Cements with Organosilicon Compounds", Ind. Eng. Chem. Prod. Res. Dev., 21, 531-533 (1982).
Svegl et al., "The influence of aminosilanes on macroscopic properties of cement paste", Cement and Concrete Research, 38, 945-954 (2008).
Kong et al., "The influence of silanes on hydration and strength development of cementitious systems", Cement and Concrete Research, 67, 168-178 (2015).
Svegl et al., "Use of Aminosilane Coupling Agents in Cementitious Materials", Macromol. Symp. , 221, 153-164 (2005).

*Primary Examiner* — Robert Jones, Jr.
(74) *Attorney, Agent, or Firm* — Christopher L. Bernard; Clements Bernard Walker PLLC

(57) ABSTRACT

The present invention relates to a coating composition and method of manufacturing said coating composition. The coating composition is a two-component coating composition for construction surfaces. The present coating composition is effectively bonded to the surface without an additional application of intermediate layer overcoming the existing problems associated with conventional concrete surface treatment methods.

12 Claims, 2 Drawing Sheets

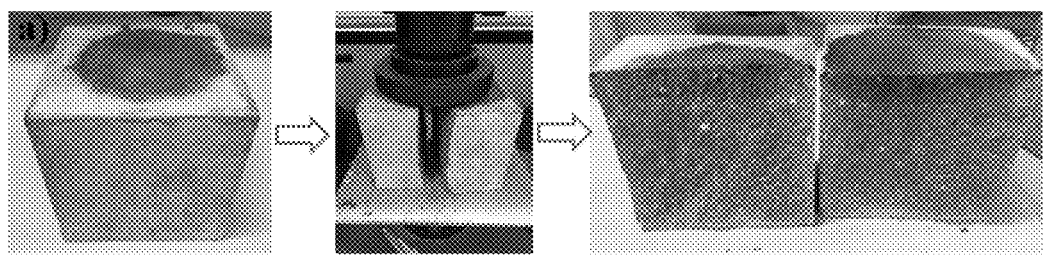
FIG. 2A
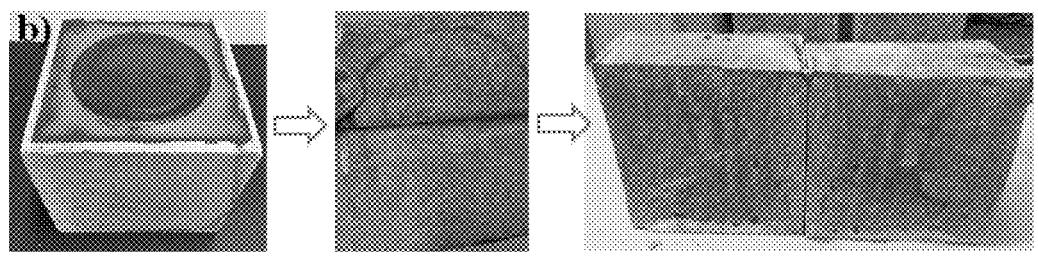
FIG. 2B
FIG. 2

ULTRA-FLEXIBLE NANO-MODIFIED CEMENTITIOUS WATERPROOFING COATING AND METHOD OF MANUFACTURING

FIELD OF INVENTION

The present invention relates to a coating composition and method of manufacturing said coating composition. In particular, the coating composition is a two-component coating composition for construction surfaces.

BACKGROUND OF INVENTION

In recent years, polymer-modified cementitious waterproof coating composition have been readily applied in the field of building and construction, as these coatings are environmental-friendly, and combine the flexibility of a polymer and the rigidity of a cement. These coating composition are often applied onto concrete surfaces to protect the concrete surfaces from water-related deteriorations.

U.S. Pat. No. 4,392,335 discloses a repair overcoating for concrete, stone, bricks and tile and even asphalts. The overcoating consists of multiple layers and each layer is bonded to the adjacent layers. For example, several embodiments of U.S. Pat. No. 4,392,335 include an adhesive epoxy intermediate underlayer that forms a bond with the base material and an overlying layer of flexible cementitious polymer material that are bonded to the underlayer. Epoxy resins are added in each layers, and hardening catalysts and solvents are arranged to increase bonding effectiveness. Usually, it is preferred to seal the upper surface of the cementitious layer with a thin coat of an epoxy sealer incorporated by ultraviolet protection additives.

U.S. Pat. No. 5,162,060 discloses a coating composition that includes synthetic polymer latex having uriedo functional groups, an amine-functional epoxy curing agent, a liquid epoxy resin, and a hydraulic cement.

U.S. Pat. No. 4,249,950 discloses an improved flexible cementitious material which is prepared by mixing an aqueous dispersion or latex of elastomeric polymer (e.g. butyl rubber) with cement (e.g. Portland cement), allowing the mixture to harden typically for 28 days under conditions of high relative humidity, and thereafter compressing the hardened material (e.g. by passing the material between rollers) to reduce the brittleness and to increase the flexibility thereof. The initial cementitious mixture preferably contains additional components such as a desiccant (e.g. lime). The resulting flexible material is useful as joint filler between concrete structures to take-up deformation therebetween.

U.S. Pat. No. 9,302,448 discloses a floor crack isolation system consists of a membrane and a deformable adhesive. The membrane includes a basemat and a flexible coating applied onto the basemat. The basemat has at least three plies; a ply of a meltblown polymer sandwiched between two plies of spunbond polymer. The flexible coating has a cementitious hydraulic component, a water-soluble, film-forming polymer and water. The finished membrane is flexible and is bonded to a subfloor with a deformable adhesive. U.S. Pat. No. 9,067,383 also discloses a flexible and rollable cementitious membrane for use as an underlayment based on the same waterproofing system via similar formula and manufacturing process.

U.S. Pat. No. 6,455,615 discloses a flexible polymer modified waterproof cement materials which can be used on a substrate or in concealed areas of construction engineering, water conservancy projects, municipal works. The waterproof material is made by kneading hydraulic cement, a polymer dispersion, a water-soluble polymer or re-dispersible resin and water. The kneaded material is mixed with cement and a toughening polymer at a weight ratio of about 100:10 to about 100:50, and then is calendared into sheets. These materials can adhere to dry or wet substrates firmly using the suitable adhesives. After application, the waterproof structure formed can bear retractive stress and deformation of the base or can resist outer impact. The water impermeability performance is shown to be only 0.3 Mpa for 90 minutes, tensile strength is about 1.5 MPa without nonwoven fabric mesh, and the elongation at break ranges from 80% to 240%.

U.S. Pat. No. 7,468,154 and U.S. Pat. No. 7,347,895 disclose a composition for making flexible articles which includes a hydraulic component of at least 50% by weight of fly ash, a water-soluble, film-forming polymer and water.

U.S. Pat. No. 7,784,542 and U.S. Pat. No. 8,598,093 disclose methods and compositions that may comprise cement, a nano-particle, latex, and water. The embodiments of the present invention include a cement composition and a method of allowing the cement composition to set in the subterranean formation. Although these resulting polymer cementitious films or sheets are flexible, accompanying drying shrinkage, the waterproof layer may crack or delaminate from the undercoated surface.

U.S. Pat. No. 8,931,228 discloses a waterproofing membrane that comprises a carrier sheet, a pressure sensitive adhesive layer on one surface of the carrier sheet, and a protective coating layer on the adhesive layer. The protective coating layer is highly reflective and operative to bond to concrete cast against it. Preferably, the protective coating layer comprises cement, polymer, and white pigment, and may optionally include filler, UV absorber and antioxidant. The protective coating layer protects the membrane against weather exposure, tolerates foot traffic and strongly adheres to concrete cast against it. U.S. Pat. No. 9,133,612 also discloses a waterproof membrane comprising a carrier sheet, a pressure sensitive adhesive layer, a protective coating layer, and a highly releasable bonding layer.

There is a need for a coating composition that forms a coat with high flexible, adhesion, waterproof and mechanical properties for construction surfaces.

Citation or identification of any reference in this section or any other section of this application shall not be construed as an admission that such reference is available as prior art for the present application.

SUMMARY OF INVENTION

The first aspect of the present invention relates to a coating composition that is water proof and highly flexible with excellent adhesion to the substrate being coated on. The present coating composition comprising a liquid component and a solid component in a weight ratio of 1:1.25 to 1:1.5. The liquid component comprises styrene-acrylate copolymer emulsion, superplasticizer, defoamer, positively charged hydrophilic nanoparticles and water. The solid component comprises hydraulic cement, non-hydraulic filler, synthetic fiber or a combination thereof. The liquid and solid components are mixed together before applying onto a substrate surface. The present coating composition may be applied onto wet or dry surfaces by block brushing, squeegee roller or sprayer. The coat formed from the present coating composition has about 20 wt % of polymer content and is associated with high elastic and waterproof performance. The present coating composition can be applied to inner, outer or concealed areas of civil engineering construction. The coating composition with high adherence property can directly adhere onto substrate material or surfaces without an intermediate adhesive layer. The substrate includes concrete, stone, bricks, tile and cement-based substrate.

The second aspect of the present invention relates to method of preparing a waterproof, flexible and adhesive coating composition. The method comprises modifying styrene-acrylate copolymer with nanoparticles by physical adsorption under high-speed mixing to form the liquid component, mixing at least one of hydraulic cement, non-hydraulic fillers, synthetic fibers using a dry mortar production liner under high speed to form the solid component, and mixing the liquid and solid components at a weight ratio of 1:1.25 to 1:1.5 until a lump-free slurry is formed. The lump-free slurry of the present coating composition is then applied onto surface in need thereof and when the coating composition is dried to form a waterproof and flexible coat, the coat has about 20 wt % polymer content.

Those skilled in the art will appreciate that the invention described herein is susceptible to variations and modifications other than those specifically described.

The invention includes all such variation and modifications. The invention also includes all of the steps and features referred to or indicated in the specification, individually or collectively, and any and all combinations or any two or more of the steps or features.

Throughout this specification, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

Furthermore, throughout the specification and claims, unless the context requires otherwise, the word "include" or variations such as "includes" or "including", will be understood to imply the inclusion of a stated integer or group of integers but not the exclusion of any other integer or group of integers.

Other definitions for selected terms used herein may be found within the detailed description of the invention and apply throughout. Unless otherwise defined, all other technical terms used herein have the same meaning as commonly understood to one of ordinary skill in the art to which the invention belongs.

Other aspects and advantages of the invention will be apparent to those skilled in the art from a review of the ensuing description.

BRIEF DESCRIPTION OF INVENTION

The above and other objects and features of the present invention will become apparent from the following description of the invention, when taken in conjunction with the accompanying drawings, in which:

FIG. 2 shows maximum depth of water penetration of concrete without any coating (FIG. 2A) and coated with coating composition of the present invention (FIG. 2B) under 0.5 MPa for 72 hours.

DETAILED DESCRIPTION OF INVENTION

Figure 1:
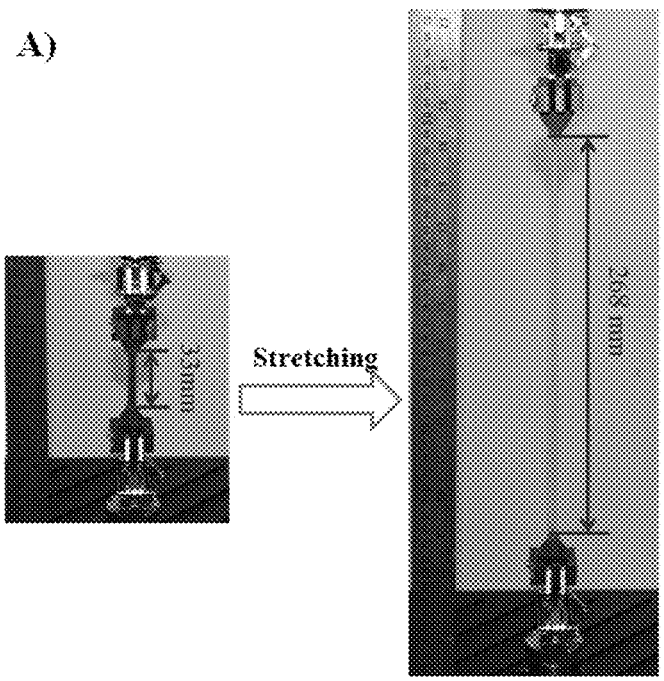
FIG. 1 shows elongation performance of a coat formed by the present coating composition (FIG. 1A) and tensile strength of three coats formed by coating composition according to the present invention (FIG. 1B).
Figure 1:
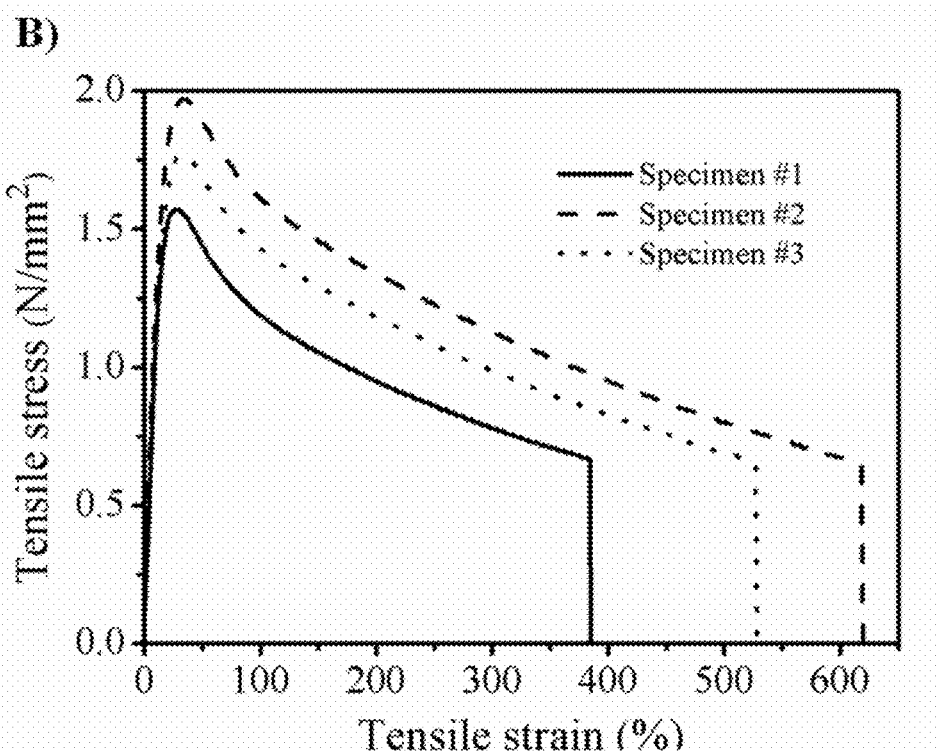

The present invention is not to be limited in scope by any of the specific embodiments described herein. The following embodiments are presented for exemplification only.

The present invention provides a novel coating composition for coating both dry and wet surfaces. The coat resulted from the present coating composition is highly waterproof with excellent elasticity and tensile strength. Additionally, the coat formed from the present coating composition adheres strongly to surfaces without any intermediate or supplementary layer. Accordingly, the present invention provides a coating composition which forms a water impermeable coat on surface with reduced delamination and cracking.

The present coating composition comprises a liquid component and a solid component in a weight ratio of 1:1.25 to 1:1.5. The liquid component comprises 100 parts of styrene-acrylate copolymer emulsion, 0.25-1.0 parts of superplasticizer, 0.25-1.0 parts of defoamer, 0.025-0.1 parts of positively charged hydrophilic nanoparticles and 10-20 parts of water to weight of the liquid component. The solid component comprises hydraulic cement and non-hydraulic filler in a weight ratio selected from 2:1, 1:1 and 1:2. Optionally, the liquid component further comprises 0.25-1.0 parts of silane coupling agent and the solid component further comprises synthetic fiber. The present coating composition has a low polymer to cement weight ratio compared to conventional cementitious coating compositions. The present coating composition overcomes the problems of separation of coat from the substrate, delamination and cracking of coat or the like, which commonly exist in conventional coating compositions, by having a low polymer to cement weight ratio. The adhesiveness of the present coating composition is further enhanced by addition of silane coupling agent. The bonding strength of the present coating composition on wet surface is above 1.2 N/mm$^2$. The liquid and solid components are mixed together before applying the present composition onto a substrate surface. The present coating composition may be applied onto wet or dry surfaces by conventional techniques readily known by one skilled in the art, such as conventional spray coating, brushing, dipping, roller coating or the like. The coat formed from the present coating composition has about 20 wt % of polymer content, and is associated with high elastic and waterproof performance. The present coating composition can be applied to inner, outer or concealed areas of civil engineering construction. The high adherence property of the present coating composition enables the coating composition to adhere onto substrate material or surfaces without an intermediate adhesive layer. The substrate includes concrete, stone, bricks, tile and cement-based substrate.

The nanoparticles of the present coating composition act as a lubricant between the polymer chains; they are absorbed and anchored onto the surface of the polymer. Presence of the nanoparticles in the present coating composition enables movement between the polymers when the coat is under stress or stretched. Thus, the coat formed from the present coating composition has excellent elasticity and tensile strength. The nanoparticles of the present coating composition are hydrophilic positively charged nanoparticles. The particle size of the nanoparticles of the present invention ranges from 5 nm to 30 nm. In some embodiments, the particle size of the nanoparticles is selected from 5 nm, 13 nm, 20 nm and 30 nm. Particle size of the nanoparticles of the present coating composition may or may not be homogeneous. Examples of nanoparticles of the present composition include, but are not limited to, nano-silica, nano-aluminum oxide, nano-zinc oxide, nano-boron, nano-iron oxide and nano-calcium carbonate. In one embodiment, the particle size of the nanoparticle is 20 nm. In another embodiment, the nanoparticle is aluminum oxide nanosphere. The present composition comprises 0.025-0.1 parts of nanoparticles. In one embodiment, the present composition comprises 0.025 parts to 0.05 parts of nanoparticles. Styrene-acrylate copolymer emulsion of the present composition has excellent anti-ultraviolet performance, good durability and good chemical resistance. This co-polymer also has a favorable film forming temperature and water resistance characteristic for use as a construction coat. The copolymer emulsion is a liquid emulsion of pH 8-10.

Superplasticizer, also known as water reducer, improves dispersion of the coating composition. The present composition comprises 0.25-1.0 parts of superplasticizer. In one embodiment, the composition comprises 0.25 parts to 0.5 parts of superplasticizer. Examples of superplasticizer of the present invention include, but are not limited to, poly (melamine sulfonate), poly(naphthalene sulfonate), polycarboxylate and derivatives thereof, as well as SBT®PCA-I, SBT®PCA-V, SBT JM®, OROTAN™ 1850 (Dow) and ADVA-109 (BASF). The present composition further comprises 0.25-1.0 parts of defoamer to remove micro bubbles and optionally 0.25-1.0 parts of silane coupling agent. The defoamer suitable for the present invention is a non-ionic organic silicon defoamer having a linear polysiloxiane as an active agent at room temperature. Examples of defoamer include, but are not limited to, Foamer®NXZ, Foamaster®111, Foamaster®8034A, FoamStar®A10, Foamstar ST 2446, FoamStar®A12 and FoamStar®SI 2250. Examples of silane coupling agent include, but are not limited to, (3-aminopropyl) trimethoxysilane (APTMS), (3-aminopropyl) triethoxysilane (APTES), (3-Glycidyloxypropyl) trimethoxysilane (GPTMS), (3-Glycidyloxypropyl) triethoxysilane (GPTES), N-2-aminoethyl-3-aminopropyltrimethoxysilane (AEAPTMS), N-2-aminoethyl-3-aminopropyltriethoxysilane (AEAPTES) or a combination thereof.

The hydraulic cements of the solid component of the present invention are those readily used by the skilled in the art, such as Portland cement and white cement. The solid component may include one or more types of hydraulic cement. Fillers suitable for the present invention include, but are not limited to, heavy calcium carbonate fillers. The filler in the solid component of the present invention enhances the strength of the resulting coat while maintain the production cost low. One or more types of filler of different sizes are included in the solid component. In one embodiment, the filler is non-hydraulic filler and the particle size of the filler is about 250-500 mesh or lower than 60 μm. The weight ratio of cement to filler of the solid component is selected from 2:1, 1:1 and 1:2. In one embodiment, the solid component comprises 100 parts of hydraulic cement and 100 parts of non-hydraulic filler by weight.

In some embodiment, the solid component further comprises fibers to enhance tear resistance and tensile strength of the present invention. Fibers are short synthetic alkali fibers, such as polyvinyl alcohol (PVA) fibers, polyester (PET) fibers and polypropylene (PP) fibers. Fibers applicable to the present invention may be 6 mm-12 mm in length and have a diameter of 15 μm-50 μm. In some embodiment, the length of short fiber is 9 mm and the diameter ranges 40 μm-50 μm. The solid component comprises 0.1%-0.5% wt of fiber.

The liquid and solid components of the present composition are mixed thoroughly to become a lump-free slurry before applying onto the substrate. The lump-free slurry of the present coating composition is then applied onto surface in need thereof and when the coating composition is dried to form a waterproof and flexible coat, the coat has about 20 wt % polymer content. The substrate may be dry, wet or pre-soaked. Multiple layers of the present coating composition may be applied onto the substrate. Addition layer should be applied after the previous layer is dried. Water may be applied onto the substrate before applying the present coating composition. The present coating composition is then cured to form the resulting coat. The resulting coat is a double network composing of stiff, brittle cement-based network cross-linked by hydrated cement and a soft, ductile nano-modified polymer network.

The second aspect of the present invention relates to method of preparing a water-resistant, flexible and adhesive coating composition. The method comprises modifying styrene-acrylate copolymer with nanoparticles by physical adsorption under high-speed mixing to form the liquid component. The nanoparticles are dispersed in water with the superplasticizer under rapid stirring to form an aqueous solution. The polymer emulsion is then added to the aqueous solution with fast mechanical stirring. Defoamer and optionally silane coupling agents are added last to form the liquid component. The solid component is manufactured by mixing at least one of hydraulic cement, non-hydraulic fillers, and synthetic fibers using a dry mortar production liner under high speed. Both liquid and solid component of the present invention can be packaged and stored for later application. The liquid and solid components are mixed at a weight ratio of 1:1.25 to 1:1.5 until a lump-free slurry is formed. The present coating composition is applied onto the substrate using block brushing, squeegee roller, sprayer or the like to form a 1.5-2 mm coat. The coat formed from the coating composition of the present invention has a fixed polymer content of 20 wt %.

EXAMPLES

Table 1 shows examples of nano-modified polymer cementitious coating composition prepared in accordance with the present invention.

TABLE 1 shows coating compositions according to the present invention.
All constituents are represented in parts by weight ratio.

| | | Example 1 | Example 2 | Example 3 | Example 4 | Example 5 |
|---|---|---|---|---|---|---|
| Liquid Component | Polymer Emulsion | 100 | 100 | 100 | 100 | 100 |
| | DI water | 10 | 10 | 10 | 10 | 10 |

TABLE 1-continued shows coating compositions according to the present invention.
All constituents are represented in parts by weight ratio.

| | | Example 1 | Example 2 | Example 3 | Example 4 | Example 5 |
|---|---|---|---|---|---|---|
| (L) | Defoamer | 0.5 | 0.5 | 0.5 | 0.5 | 0.5 |
| | Superplasticizer | 0.25 | 0.5 | 0.5 | 0.5 | 0.5 |
| | $Al_2O_3$ Nanoparticles | 0.025 | 0.05 | 0.05 | 0.05 | 0.05 |
| | Silane coupling agent | — | — | 0.5 | 0.5 | 0.5 |
| Solid Component (S) | Hydraulic cement | 100 | 100 | 100 | 100 | 100 |
| | Calcium carbonate | 100 | 100 | 100 | 100 | 100 |
| | Short fiber | — | — | — | 0.2 (PET) | 0.2 (PVA) |
| L/S ratio | | 1:1.5 | 1:1.5 | 1:1.5 | 1:1.5 | 1:1.5 |

Properties of example coating compositions 1-5 of the present invention (Table 1) are tested. Table 2 and Table 3 below show the physical properties of coating compositions of the present application and four commercially available concrete coating compositions.

TABLE 2 shows physical properties of coating compositions of the present application.

| Example | Tensile strength (N/mm2) | Elongation at break (%) | Bonding strength (N/mm2) | Impermeability (0.5 MP, 72 hrs) | VOC (g/L) |
|---|---|---|---|---|---|
| 1 | 1.78 | 354 | 1.36 | Permeation free | 15.3 |
| 2 | 2.01 | 365 | 1.49 | Permeation free | 14.6 |
| 3 | 1.69 | 651 | 1.22 | Permeation free | 23.3 |
| 4 | 1.76 | 618 | 1.26 | Permeation free | 23.6 |
| 5 | 1.80 | 576 | 1.30 | Permeation free | 22.5 |

TABLE 3 shows physical properties of commercially available concrete coating compositions.

| Specimen | L/P | Tensile strength (N/mm2) | Elongation at break (%) | Bonding strength (N/mm2) | Impermeability (0.5 MP, 72 hrs) | VOC (g/L) |
|---|---|---|---|---|---|---|
| Product E | 16.9:25 | 0.72 | 328 | 0.65 | Water leakage | 22 |
| Product F | 18:25 | 0.74 | 296 | 0.81 | Water leakage | 26 |
| Product G | 1:1.5 | 1.79 | 82 | 1.15 | Water leakage | 5.4 |
| Product R | 1:1.25 | 1.10 | 297 | 0.97 | Water leakage | 6.9 |

Examples 1-5 are prepared as described above and cured for 7 days. The coating composition of the present invention is shown to have a tensile strength of 1.5-2.0 $N/mm^2$ (FIG. 1B), 350%-650% elongation at break (FIG. 1A) and a bonding strength to concrete of 1.0-1.5 $N/mm^2$. The waterproof performance of the coating composition is tested according to BS EN 12390-8 standards. Substrate having coated with the present coating composition is water impermeable. It is demonstrated that the maximum water penetration depth of concrete coated with coating composition of the present invention is 0 mm under 0.5 Mpa for 72 hours (FIG. 2B). On the other hand, the maximum water penetration depth of concrete with no coat is approximately 150 mm under 0.5 Mpa for 72 hours (FIG. 2A). The present coating composition is also safe; volatile organic content (VOC) of the present coating composition is less than 50 g/L.

Commercially available coating products E, F, G and R which exclude nanoparticle are also tested for their physical properties (Table 3). It is showed that none of the commercially available products is water impermeable under 0.5 Mpa for 72 hours. While Products E and F shows very good elongation at break, its bonding strength and tensile strength remain weak. Product G has good bonding strength and tensile strength, but it is not flexible; tensile strength, elongation and bonding strength of Product R is weaker as compared to the coating composition of the present invention.

The above examples demonstrate the present invention provides a coating composition for surfaces which is water impermeable, flexible with high tensile strength. The coating composition is effectively bonded to the surface without an additional application of intermediate layer overcoming the existing problems associated with conventional concrete surface treatment methods.

If desired, the different functions discussed herein may be performed in a different order and/or concurrently with each other. Furthermore, if desired, one or more of the above-described functions may be optional or may be combined.

While the foregoing invention has been described with respect to various embodiments and examples, it is understood that other embodiments are within the scope of the present invention as expressed in the following claims and their equivalents. Moreover, the above specific examples are to be construed as merely illustrative, and not limitative of the remainder of the disclosure in any way whatsoever. Without further elaboration, it is believed that one skilled in the art can, based on the description herein, utilize the present invention to its fullest extent. All publications recited herein are hereby incorporated by reference in their entirety.

What is claimed is:

1. A coating composition comprising a liquid component and a solid component in a weight ratio of 1:1.25 to 1:1.5; the liquid component comprises 100 parts of styrene-acrylate copolymer emulsion, 10-20 parts of water, 0.025-0.1 parts of nanoparticles, 0.25-1.0 parts of superplasticizer and 0.025-1.0 parts of defoamer to weight of the liquid component; and the solid component comprises hydraulic cement and non-hydraulic filler.

2. The coating composition of claim 1, wherein the liquid component further comprises 0.25-1.0 parts of silane coupling agent.

3. The coating composition of claim 1, wherein the solid component further comprises fibers.

4. The coating composition of claim 1, wherein the nanoparticle comprises nano-silica, nano-aluminum oxide, nano-zinc oxide, nano-boron, nano-iron oxide or nano-calcium carbonate and particle size of the nanoparticles are 5 nm to 30 nm.

5. The coating composition of claim 1, wherein the superplastizier comprises poly(melamine sulfonate), poly (naphthalene sulfonate), polycarboxylate or derivatives thereof.

6. The coating composition of claim 2, wherein the silane coupling agent comprises (3-aminopropyl) trimethoxysilane, (3-aminopropyl) triethoxysilane, (3-Glycidyloxypropyl) trimethoxysilane, (3-Glycidyloxypropyl) triethoxysilane, N-2-aminoethyl-3-aminopropyltrimethoxysilane or N-2-aminoethyl-3-aminopropyltriethoxysilane.

7. The coating composition of claim 1, wherein the hydraulic cement comprises Portland cement or white cement and the filler comprises heavy calcium carbonate filler.

8. The coating composition of claim 1, wherein weight ratio of cement to filler is selected from 2:1, 1:1 and 1:2.

9. The coating composition of claim 3, wherein the fiber comprises polyvinyl alcohol (PVA) fibers, polyester (PET) fibers or polypropylene (PP) fibers.

10. The coating composition of claim 3, wherein the solid component comprises 0.1%-0.5% wt of fibers and the fibers are 6 mm-12 mm in length and have a diameter of 15 μm-50 μm.

11. A method of coating a surface comprising applying the coating composition of claim 1.

12. The method of claim 11, wherein the surface comprises concrete, stone, bricks, tile and cement-based surface.

* * * * *

UNITED STATES PATENT AND TRADEMARK OFFICE
CERTIFICATE OF CORRECTION

PATENT NO. : 9,738,563 B1
APPLICATION NO. : 15/172143
DATED : August 22, 2017
INVENTOR(S) : Su Ping Bao et al.

It is certified that error appears in the above-identified patent and that said Letters Patent is hereby corrected as shown below:

On the Title Page

In item (73) – Assignee, the correct Assignee's Name should be Nano and Advanced Materials Institute Limited instead of Nona and Advanced Materials Institute Limited.

Signed and Sealed this
Twenty-eighth Day of August, 2018

Andrei Iancu
*Director of the United States Patent and Trademark Office*